United States Patent
Shimozato et al.

(10) Patent No.: US 11,908,676 B2
(45) Date of Patent: Feb. 20, 2024

(54) XENON LAMP FOR PROJECTOR

(71) Applicant: Ushio Denki Kabushiki Kaisha, Tokyo (JP)

(72) Inventors: Masahiro Shimozato, Tokyo (JP); Noriaki Takeishi, Tokyo (JP)

(73) Assignee: Ushio Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/353,358

(22) Filed: Jul. 17, 2023

(65) Prior Publication Data

US 2024/0030020 A1    Jan. 25, 2024

(30) Foreign Application Priority Data

Jul. 19, 2022  (JP) ................................ 2022-114638

(51) Int. Cl.
*H01J 61/06* (2006.01)
*H01J 61/16* (2006.01)
*G03B 21/20* (2006.01)

(52) U.S. Cl.
CPC .......... *H01J 61/06* (2013.01); *G03B 21/2026* (2013.01); *H01J 61/16* (2013.01)

(58) Field of Classification Search
CPC .......... H01J 61/16; H01J 61/06; H01J 61/067; H01J 61/0672; H01J 61/073; H01J 61/0732; G03B 21/2026
USPC ....................................................... 313/643
See application file for complete search history.

(56) References Cited

U.S. PATENT DOCUMENTS

| | | | |
|---|---|---|---|
| 2005/0194904 A1* | 9/2005 | Hosoya | H01J 61/86 313/631 |
| 2009/0289550 A1* | 11/2009 | Koger | H01J 61/0735 313/571 |

FOREIGN PATENT DOCUMENTS

| | | | |
|---|---|---|---|
| JP | 2003-051286 A | | 2/2003 |
| JP | 2004-134104 A | | 4/2004 |
| JP | 2007149516 A | * | 6/2007 |
| JP | 2007-265707 A | | 10/2007 |
| JP | 2009238664 A | * | 10/2009 |

(Continued)

OTHER PUBLICATIONS

OSRAM, "Low light output of a XBO lamp (for a NEC projector)", Apr. 4, 2018, XP093091736, URL: https://www.youtube.com/watch?v=5iEtmW1Qse0, sequences at 0:17-1:40 and from 7:02 onwards.

(Continued)

*Primary Examiner* — Christopher M Raabe
(74) *Attorney, Agent, or Firm* — Studebaker & Brackett PC

(57) ABSTRACT

The xenon lamp for a projector, the xenon lamp comprises a light-emitting tube and an anode and a cathode that are arranged inside the light-emitting tube so as to face each other through a gap in a first direction, the anode including: a body part and a chip part whose cross-sectional area cut along a first plane orthogonal to the first direction is smaller than the cross-sectional area of the body part, the chip part including: a first part joined to the body part, the first part protruding toward the cathode and having a tapered shape; and a second part joined to the first part, the second part protruding toward the cathode and having a shape such that an angle of inclination of an outer profile of the second part differs from an angle of inclination of an outer profile of the first part.

4 Claims, 5 Drawing Sheets

(56) References Cited

FOREIGN PATENT DOCUMENTS

JP          2011141998 A   *   7/2011
JP          2022002182 A   *   1/2022

OTHER PUBLICATIONS

The extended European search report issued by the European Patent Office dated Dec. 21, 2023, which corresponds to European Patent Application No. 23185169.2 and is related to U.S. Appl. No. 18/353,358.

* cited by examiner

XENON LAMP FOR PROJECTOR

TECHNICAL FIELD

The present invention relates to a xenon lamp for a projector.

BACKGROUND ART

Conventionally, a short-arc discharge lamp has been known as a light source used for, for example, a projector or other image projection devices. The short-arc discharge lamp is configured such that an anode and a cathode are arranged opposite to each other within a light-emitting tube in which a light emitting gas such as xenon gas is sealed.

With reference to FIG. 6A, a lighting operation of a short-arc discharge lamp in which xenon gas is sealed (hereinafter referred to as a "xenon lamp" for convenience or a "lamp" for simplicity) will be described. FIG. 6A is a conceptual diagram of an arc generated when a xenon lamp is lit. In FIG. 6A, an area in which the arc is generated is hatched. The same applies to succeeding drawings.

First, a high voltage (a starting voltage) is applied between a cathode 82 and an anode 83 inside a light-emitting tube 81 to start a xenon lamp. By this starting voltage, dielectric breakdown occurs between both electrodes, an electric current called an inrush current flows, and an arc A1 is formed. The arc A1 is maintained by supply of electric currents between both electrodes, and the xenon lamp transitions to arc discharge. The xenon lamp 80 is designed to provide desired light using this arc discharge.

Xenon gas inside the light-emitting tube 81 is circulated by convection due to heat, and the arc A1 is subject to force in a Z direction caused by this convection. The Z direction is typically a vertical direction. After the xenon lamp transitions to arc discharge, a flow of electrons from the cathode 82 to the anode 83 is large in the arc A1. Thus, even if force by convection of the gas described above is acting, the arc A1 is not greatly affected. Meanwhile, until the xenon lamp 80 transitions from the start of operation to arc discharge, a flow of electrons is relatively small in the arc, and thus there is a case where the arc A1 changes in position by being affected by convection of the gas.

FIG. 6B is a conceptual diagram of an arc that is changed in position by convection of a gas. When an arc A2 is subject to force in the Z direction and is changed as shown in FIG. 6B, voltage required to maintain the arc A2 is high. If the voltage exceeds a level of voltage that can be supplied from a power source, there is a case where the xenon lamp 80 goes out because the arc A2 cannot be maintained. This problem surfaces particularly with a lamp that has undergone a lighting operation for a certain degree of time (for example, 1,000 hours or more).

Meanwhile, Patent Document 1 described below proposes a technique for applying a magnetic field to a lamp from outside a light-emitting tube to reduce a change in an area where an arc is formed even after the lamp undergoes a lighting operation for a long time.

PRIOR ART DOCUMENT

Patent Documents

Patent Document 1: JP-A-2003-51286

SUMMARY OF THE INVENTION

Problems to be Solved by the Invention

The technique described in Patent Document 1 above causes Lorentz force to act on the arc through application of the magnetic field, and thus may be able to reduce a change in position of the arc during the start of the lamp described above. However, a means of applying the magnetic field to reduce a change of the arc is disposed outside the light-emitting tube. This condition makes a device structure of the lamp complicated. Further, this causes concern about an influence given to design of an image projection device or a projector in which this lamp is used.

In view of the above-described circumstances, an object of the present invention is to provide a xenon lamp for a projector wherein the xenon lamp is less likely to go out during start of operation even after undergoing a lighting operation for a long time.

Means for Solving the Problems

A xenon lamp for a projector, according to the present invention, includes a light-emitting tube and an anode and a cathode that are arranged inside the light-emitting tube so as to face each other through a gap in a first direction, the anode including: a body part whose cross-sectional area cut along a first plane orthogonal to the first direction is substantially uniform; and a chip part whose cross-sectional area cut along the first plane is smaller than the cross-sectional area of the body part, the chip part protruding in a direction that extends from an end face of the body part adjacent to the cathode toward the cathode, the chip part including: a first part joined to the body part, the first part protruding toward the cathode and having a tapered shape such that a cross-sectional area of the first part cut along the first plane shrinks with a decrease in distance to the cathode in the first direction; and a second part joined to the first part, the second part protruding toward the cathode and having a shape such that an angle of inclination of an outer profile of the second part differs from an angle of inclination of an outer profile of the first part when viewed in a second direction that is parallel to the first plane and orthogonal to the first direction, wherein the shape of the second part satisfies the following relationships (1) and (2):

$$0.5 \leq D2/D1 \leq 1.5 \tag{1}$$

$$0.3 \leq H1/D1 \leq 1.0 \tag{2}$$

In the above relationships (1) and (2), H1 represents a length of the second part in the first direction; D1 represents a length of a distal end of the second part adjacent to the cathode in a third direction orthogonal to the first direction and the second direction; and D2 represents a length between places at which the first part and the second part are joined together in the third direction, when viewed in the second direction.

As described above, for the xenon lamp that has undergone a lighting operation for a long time, a phenomenon in which the arc changes in position and the lamp goes out is likely to occur during the start of operation. This is because the cathode included in the lamp is worn due to the long-time lighting operation. FIG. 6C is a conceptual diagram showing a change in shape of a cathode of a lamp that has undergone a lighting operation for a long time.

As shown in FIG. 6C, since the lamp has undergone a lighting operation for a long time, a chip part of a cathode 82 in a −X direction is worn and deformed. In FIG. 6C, a worn part of the cathode 82 is indicated with a dotted line. In other words, due to the lighting operation performed for a long time, a diameter 82a of an end face of the cathode 82 adjacent to an anode 83 is increased. Since the cathode 82 is worn in this way, the end face of the cathode 82 in the −X direction is moved from a position 82b to a position 82c, and a distance between the cathode 82 and the anode 83 is widened. In one example, there is a case in which the diameter 82a of the end face of the cathode 82 in the lamp is 0.45 mm before a lighting operation, and after the lamp is lit for 3,000 hours, the diameter 82a of the end face is increased to 1.9 mm and as a result, the distance between the cathode and the anode is widened from 4 mm to 5 mm.

When the distance between the cathode and the anode is widened in this way, voltage needed to maintain the arc formed between the cathode and the anode rises. As a result, the xenon lamp that has been used for a long time is likely to go out due to a change in position of the arc during the start of operation (refer to FIG. 6B).

In response to this problem, making a hypothesis that a tendency of the lamp to go out during the start of operation may be greatly affected by an electric field that is formed in a neighborhood of the anode when a voltage is applied between the anode and the cathode, the inventors of the present invention conducted intensive studies on a shape of the anode to have different equipotential surfaces of the electric field. Consequently, the studies have newly proven that with the above-described configuration, a xenon lamp that is less likely to go out during the start of operation can be implemented. This will be described in detail later.

The going-out of the lamp is less likely to occur during the start of operation. This, as compared with the conventional technique, decreases a number of starting actions needed to reach a lit state and shortens time required to start the lamp. Further, a decrease in the number of starting actions leads to a decrease in a number of times at which a high voltage is applied to the lamp to start operation. This helps to prolong the life of the lamp.

The xenon lamp that is mounted on a projector allows a decrease in actions required to start the projector. Further, the tendency of the lamp to go out during the start of operation is reduced and thus the lamp can swiftly respond to an urgent request for the start of operation.

In the xenon lamp for a projector, the shape of the second part may further satisfy the following relationships (3) and (4):

$$1.2 \leq D2/D1 \leq 1.5 \quad (3)$$

$$0.31 \leq H1/D1 \leq 0.36 \quad (4)$$

It has been proven that the xenon lamp configured as described above provides a satisfactory illuminance maintenance rate while the tendency of the xenon lamp to go out during the start of operation is reduced. This will be described in detail later.

In the present specification, the "illuminance maintenance rate" refers to a ratio of illuminance the xenon lamp has after being lit for any period of time relative to illuminance of the xenon lamp in an initial state. The initial state described herein is, for example, a state that the xenon lamp is in immediately after being delivered.

The xenon lamp for a projector may be disposed, when being lit, such that the first direction matches a horizontal direction.

When the xenon lamp is disposed such that the first direction matches the horizontal direction, an arc formed between the cathode and the anode is readily affected by convection of the gas inside the light-emitting tube. Nevertheless, even in such a case, the above-described configuration helps to reduce the tendency of the lamp to go out during the start of operation.

Effect of the Invention

According to the present invention, it is possible to provide a xenon lamp for a projector wherein the xenon lamp is less likely to go out during start of operation even after undergoing a lighting operation for a long time.

MODE FOR CARRYING OUT THE INVENTION

[Overview of Lamp]

A short-arc xenon lamp according to an embodiment of the present invention will be described with reference to the drawings. Note that the drawings are all schematic illustrations and dimensional ratios and numbers of parts on the drawings do not necessarily match the actual dimensional ratios and numbers of parts.

Figure 1:
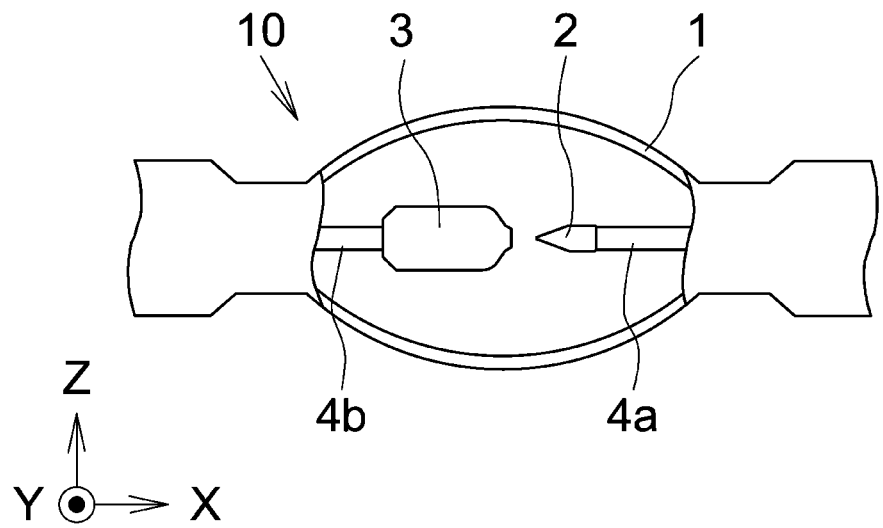
FIG. 1 is a conceptual diagram showing an overview of a xenon lamp according to an embodiment of the present invention.

FIG. 1 is a conceptual diagram showing an overview of a lamp. In the following drawings, an X-Y-Z coordinate system is also appropriately shown as needed. In the coordinate system, a direction in which a cathode 2 and an anode 3 face each other is defined as an X direction, and other directions that are orthogonal to the X direction and orthogonal to each other are defined as a Y direction and a Z direction. Under this definition, FIG. 1 is a schematic view of a lamp 10, viewed in a −Y direction.

In FIG. 1, the X direction corresponds to a "first direction", the Y direction corresponds to a "second direction", and the Z direction corresponds to a "third direction".

In the following description, in the case of distinguishing whether the direction is positive or negative, the positive or negative symbol is added, such as the "+X direction" or the "−X direction". In the case where there is no need to distinguish between positive and negative directions, the direction is simply described as the "X direction". Namely, in the present specification, in the case where the direction is simply described as the "X direction", both "+X direction" and "−X direction" are included. The same applies to the Y direction and the Z direction.

The lamp 10 is a short-arc discharge lamp. More specifically, as shown in FIG. 1, the lamp 10 includes the cathode 2 and the anode 3 that are disposed inside a light-emitting tube 1. The cathode 2 and the anode 3 are supported by lead rods (4a, 4b), respectively, inside the light-emitting tube 1. Shapes of the cathode 2 and the anode 3 will be described later.

The short-arc discharge lamp is a lamp in which the cathode 2 and the anode 3 are arranged so as to face each other through a gap of 10 mm or less (a value when the lamp is turned off without thermal expansion). The gap between the electrodes is, for example, 4 mm. The lamp 10 is primarily mounted on a projector. The lamp is typically disposed, when being lit, such that the Z direction matches a vertical direction.

The light-emitting tube 1 is, for example, shaped from a quartz glass tube and may be in the shape of a sphere or an ellipsoid. In an internal space of the light-emitting tube 1, xenon gas is sealed as a light-emitting substance at a predetermined pressure.

Sealed tubes (not shown) are disposed on both ends of the light-emitting tube 1 in the X direction. In addition, bases are attached to the sealed tubes and are electrically connected to the lead rods (4a, 4b). The lead rods (4a, 4b) are made of a material containing a high melting point metal such as tungsten.

[Cathode Structure]

Figure 2:
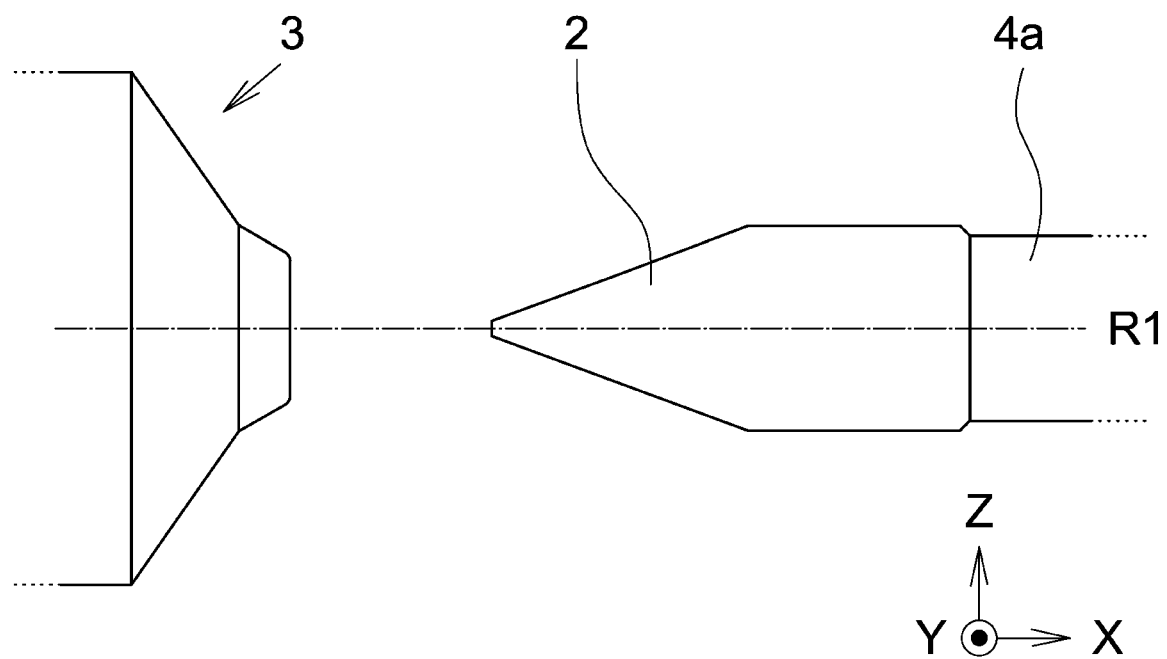
FIG. 2 is an enlarged cross-sectional view of a cathode.

With reference to FIG. 2, a structure of the cathode 2 will be described. FIG. 2 is an enlarged cross-sectional view of the cathode in the lamp 10. The cathode 2 is in the shape of a rotating body centered around a central axis R1. FIG. 2 shows a cross section of the cathode 2 on an X-Z plane that includes the central axis R1.

As shown in FIG. 2, the cathode 2 includes a conical trapezoidal part and a cylindrical part located on a +X direction side of the conical trapezoidal part, for example. A width of the conical trapezoidal part in the Z direction gets narrower with a decrease in distance to the anode 3 in the X direction, whereas a width of the cylindrical part in the Z direction is substantially uniform. The +X direction side of the cylindrical part is connected to the lead rod 4a. A maximum outer diameter of the cathode 2 is, for example, 6 mm. The cathode 2 is made of a material containing a high melting point metal such as thoriated tungsten.

[Anode Structure]

Figure 3:
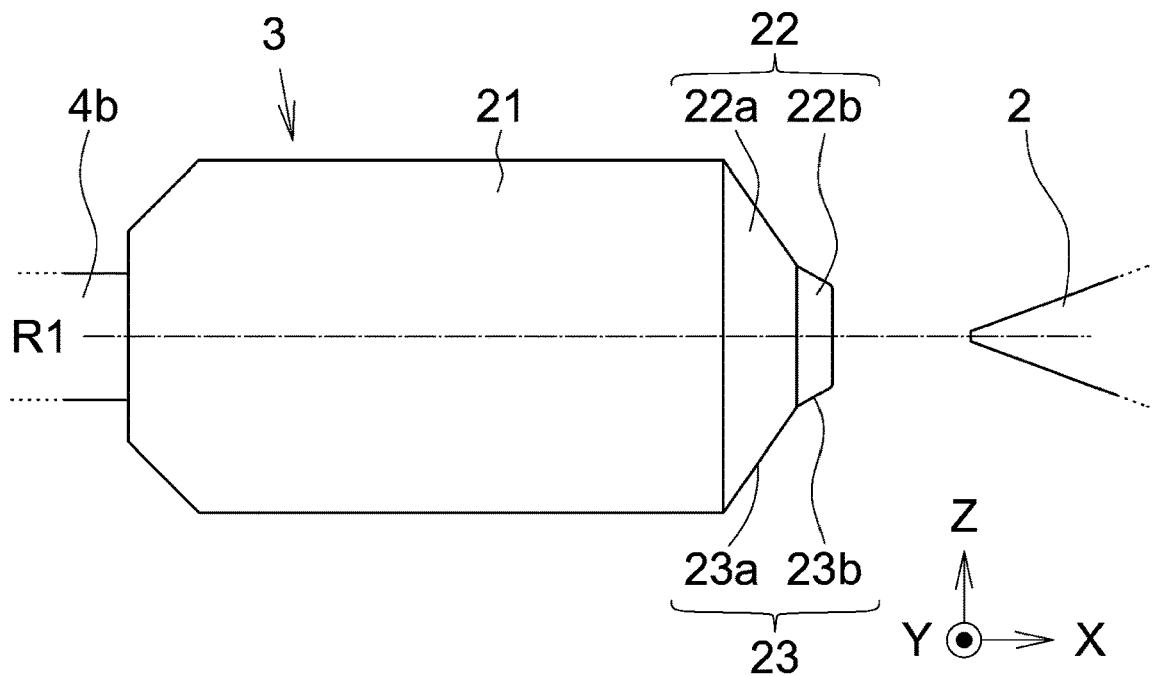
FIG. 3 is an enlarged cross-sectional view of an anode.

With reference to FIG. 3, a structure of the anode 3 will be described. FIG. 3 is an enlarged cross-sectional view of the anode in the lamp 10. The anode 3 is in the shape of a rotating body centered around the central axis R1. FIG. 3 shows a cross section of the anode 3 on the X-Z plane that includes the central axis R1.

As shown in FIG. 3, the anode 3 includes a body part 21 and a chip part 22 that are each described later. A side of the body part 21 opposite the chip part 22 in the X direction is connected to the lead rod 4b. The body part 21 includes a cylindrical part whose width in the Z direction is substantially uniform. An outer diameter of the body part 21 is, for example, 15 mm.

The chip part 22 is located nearer to the cathode 2 in comparison with the body part 21 in the X direction and includes a first part 22a and a second part 22b. A width of the chip part 22 in the Z direction is narrower than the body part 21.

The first part 22a has a tapered shape such that a width of the first part in the Z direction gets narrower with a decrease in distance to the cathode 2 in the X direction. In other words, a cross-sectional area of the first part 22a cut along a Y-Z plane shrinks with progress in the +X direction.

The second part 22b is joined to the first part 22a and protrudes in the +X direction. When viewed in the −Y direction, an outer profile 23 of the chip part 22 includes an outer profile 23a of the first part and an outer profile 23b of the second part, and these outer profiles have different shapes. In an example shown in FIG. 3, the second part 22b has a tapered shape such that a width of the second part in the Z direction gets narrower with a decrease in distance to the cathode 2 in the X direction. However, the shape may be such that the width of the second part in the Z direction gets greater with a decrease in distance to the cathode 2 in the X direction.

A material for the anode 3 is, for example, a high melting point metal such as tungsten. The anode 3 is made by cutting any of these materials through a process such as lathing. Some areas, such as a place at which the body part 21 and the chip part 22 are joined together and a place at which the first part 22a and the second part 22b are joined together, may be chamfered.

Figure 4A:
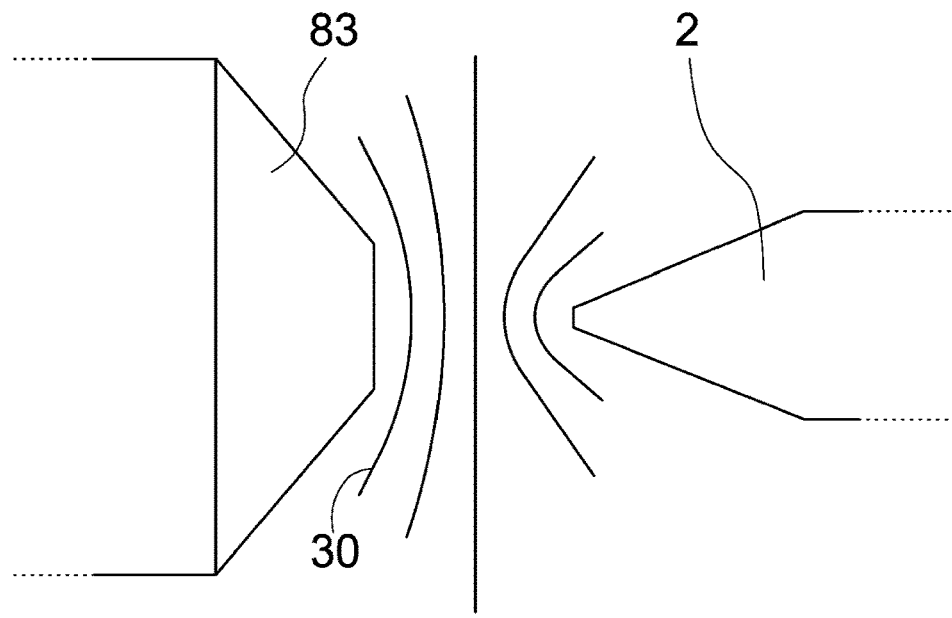
FIG. 4A is a conceptual diagram of equipotential surfaces formed in a neighborhood of a conventional anode.
Figure 4B:
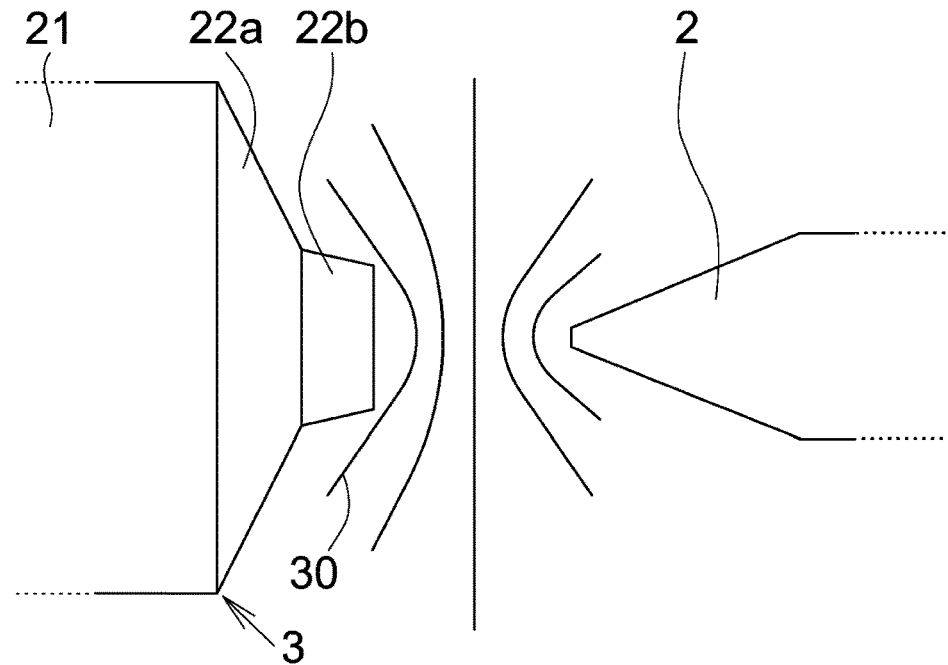
FIG. 4B is a conceptual diagram of equipotential surfaces formed in a neighborhood of an anode according to an embodiment of the present invention.

As for the anode 3 shaped in this way, a shape of an electric field that is formed in a neighborhood of the anode 3 when a voltage is applied will be described. FIG. 4A is a conceptual diagram of equipotential surfaces formed in a neighborhood of a conventional anode, and FIG. 4B is a corresponding diagram in a case of the anode 3 according to the present embodiment. In FIGS. 4A and 4B, the equipotential surfaces are schematically indicated by solid lines. As shown in FIG. 4B, since the anode 3 has the shape described above, an equipotential surface 30 in the neighborhood of the anode 3 is curved more toward the anode 3 as compared with a case of the conventional anode 83. In this way, the equipotential surface is curved toward the anode 3, and hence lines of the electric field orthogonal to the equipotential surface are directed toward the chip part 22 of the anode 3. Thus, the arc formed between the cathode and the anode is attracted to a neighborhood of the chip part 22, and a change of the arc is lessened. This helps to reduce the tendency of the lamp to go out.

[Experiment 1]

The inventors of the present invention made a detailed study of the anode shape configured as described above and conducted an experiment using a lamp they actually made to observe whether or not the lamp goes out during the start of operation. A description of this experiment 1 will be given below.

Figure 5:
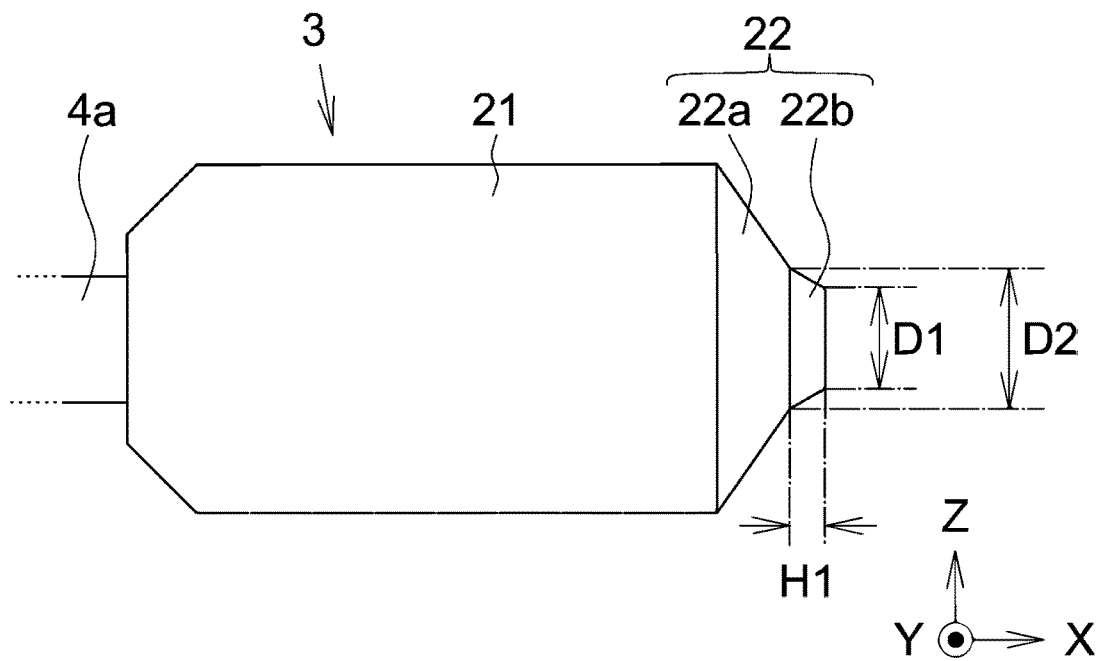
FIG. 5 is a drawing showing parameters of an anode.

Table 1 below shows results obtained through a determination of the studied anode shape of the lamp in terms of lamp going-out and illuminance maintenance. As shown in FIG. 5, H1 represents a length of the second part 22b in the X direction, D1 represents a Z direction length of an end face of the second part 22b adjacent to the cathode 2, and D2 represents a Z direction length between places at which the first part 22a and the second part 22b are joined together, when viewed in the −Y direction. In a conventional example, such an anode does not have the second part 22b, and thus a diameter of an end face of the anode in the +X direction is written in the D1 column for convenience.

Figure 6A:
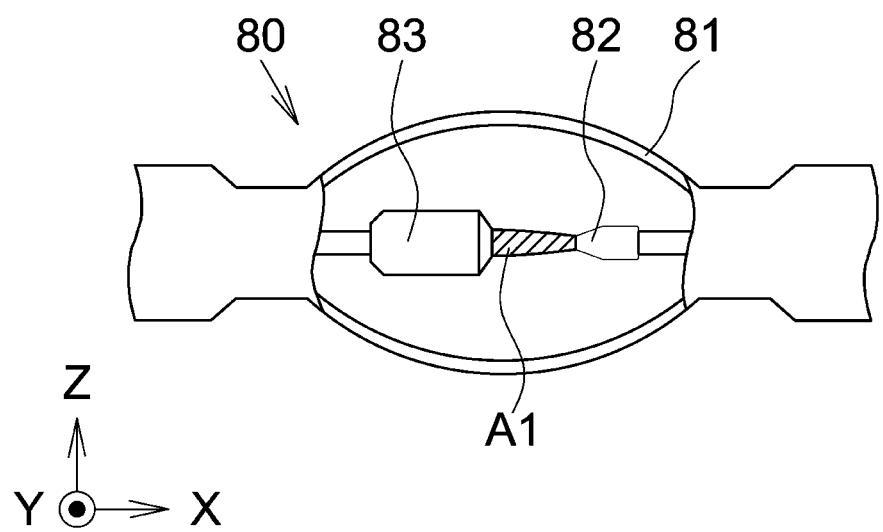
FIG. 6A is a conceptual diagram of an arc generated when a xenon lamp is lit.
Figure 6B:
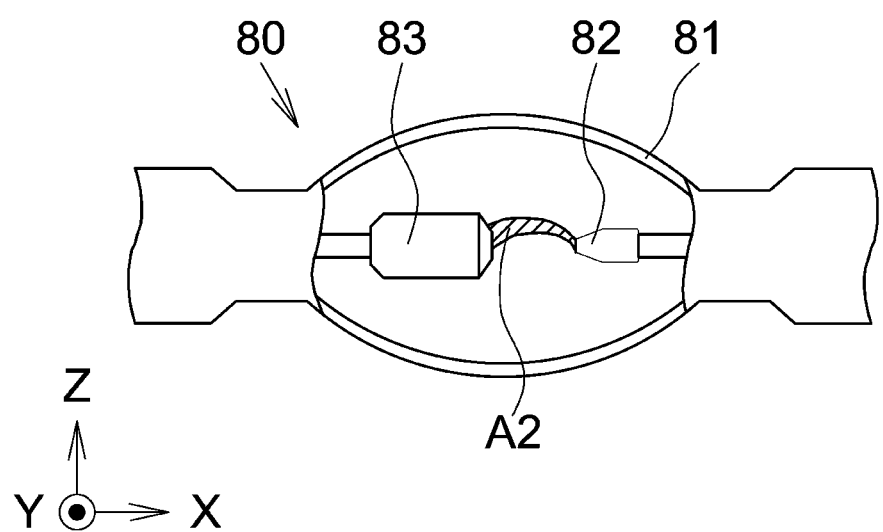
FIG. 6B is a conceptual diagram of an arc that is changed in position by convection of a gas.
Figure 6C:
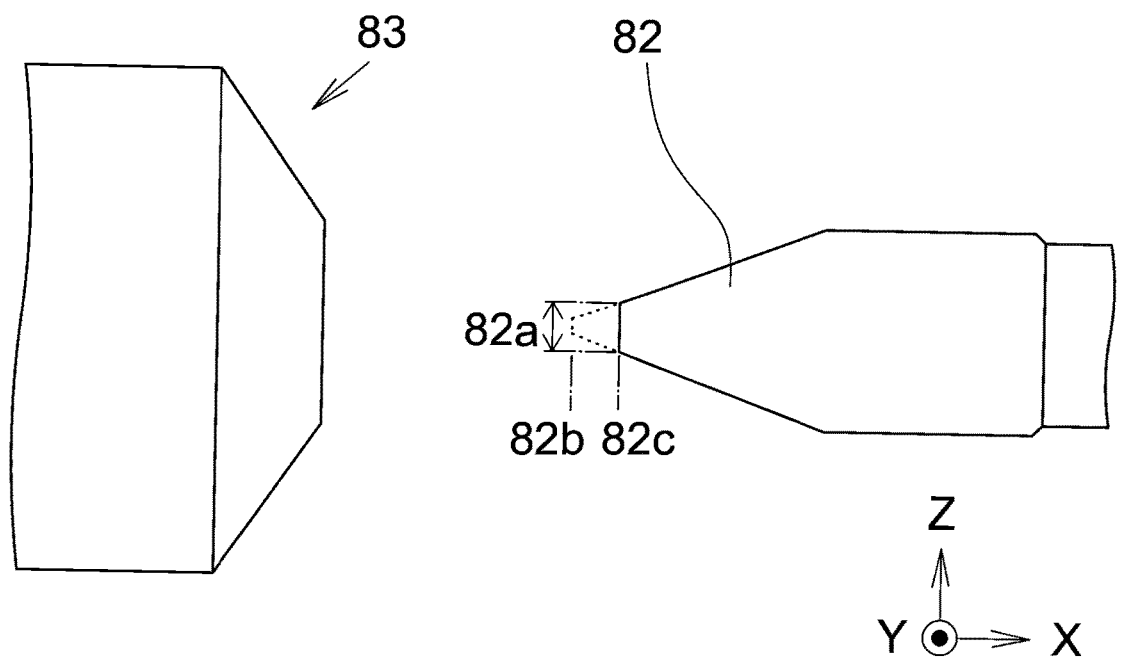
FIG. 6C is a conceptual diagram showing a change in shape of a cathode of a lamp that has undergone a lighting operation for a long time.

In tests to determine the tendency of the lamp to go out, in order to reproduce the lamp that has been lit for a long time, the diameter of the end face of the cathode 2 in the −X direction was set to 1.9 mm, and the distance between the cathode and the anode was set to 5 mm (refer to FIG. 6C). A starting process for this lamp was performed 10 times to ascertain whether or not the lamp to go out. One that did not go out was evaluated as A, and one that went out was evaluated as B. The lamp was disposed, when being lit, such that the Z direction matched a vertical direction and that the X and the Y directions matched a horizontal direction (refer to FIG. 1).

Tests were also conducted to determine the illuminance maintenance rate. The illuminance maintenance rate referred to herein was a ratio of illuminance the lamp had after being lit for 3,000 hours relative to illuminance the lamp had in a state immediately after being produced. Illuminance was measured in accordance with JIS C 7801 "Measuring methods of lamps for general lighting". An illuminance maintenance rate of 50% or more was evaluated as C and an illuminance maintenance rate of less than 50% was evaluated as D. Since the illuminance maintenance rate in the conventional example was around 50%, 50% was used as a standard. Just to be sure, at the time of starting tests to determine the illuminance maintenance, the shape of the cathode was in an initial state (a state immediately after the cathode was produced), unlike in the tests to determine the tendency of the lamp to go out.

0.5 or greater and more preferably 0.6 or greater. If H1/D1 increases, heat capacity in a tip portion of the anode decreases, and the temperature is likely to rise. As a result, during lighting up, the anode is likely to be melted or deformed. With this in view, H1/D1 is preferably 1.0 or less and more preferably 0.8 or less.

In Experiment 1 above, the results were observed using the lamp with a rated power of 2 kW. Meanwhile, even if the rated power of the lamp changes, dimensions of the cathode 2, the anode 3, and other parts only increase, and the dimensional ratio does not greatly change. Thus, the present invention can be applied to lamps with different rated power levels through the similar logic.

When D1 is taken as an example, the lamp with a rated power of 2 kW is designed with D1 ranging from 3.5 mm to 5.8 mm. D1 ranges from 5.4 mm to 9.0 mm for a rated power of 4 kW, and D1 ranges from 7.4 mm to 10.0 mm for a rated power of 6.5 kW. D1 can be designed according to the

TABLE 1

|  | Rated Power | D1 | D2 | H1 | D2/D1 | H1/D1 | Determine Lamp Going Out | Determine Illuminance Maintenance |
|---|---|---|---|---|---|---|---|---|
| Conventional Example | 2 kW | 3.5 | — | — | — | — | B | C |
| Comparative Example 1 | | 3.5 | 8.3 | 2 | 2.36 | 0.57 | B | — |
| Comparative Example 2 | | 4 | 4.4 | 1 | 1.11 | 0.25 | B | — |
| Example 1 | | 4.2 | 6.3 | 1.5 | 1.5 | 0.36 | A | C |
| Example 2 | | 4.3 | 6 | 1.5 | 1.4 | 0.35 | A | — |
| Example 3 | | 4.4 | 5.4 | 1.5 | 1.23 | 0.34 | A | C |
| Example 4 | | 5.8 | 7 | 1.8 | 1.2 | 0.31 | A | C |
| Example 5 | | 5 | 5.8 | 1.5 | 1.16 | 0.3 | A | D |
| Example 6 | | 3.5 | 4.6 | 2 | 1.31 | 0.57 | A | — |
| Example 7 | | 4 | 4.6 | 1.5 | 1.16 | 0.38 | A | D |
| Example 8 | | 4.5 | 5.1 | 1.5 | 1.14 | 0.33 | A | D |
| Example 9 | | 4.5 | 3.9 | 1.5 | 0.86 | 0.33 | A | — |

As shown in Table 1, it is observed that the lamp does not go out in a range in which D2/D1 is 1.5 or less and H1/D1 is 0.3 or greater. Further, in a range in which D2/D1 is from 1.2 to 1.5 and H1/D1 is from 0.31 to 0.36, results were obtained such that the lamp is prevented from going out and the illuminance maintenance rate is satisfactory. In this way, the results have proven that the shape of the anode configured as described above helps to reduce the tendency of the lamp to go out.

From the viewpoint of guaranteeing mechanical strength of the second part 22b of the anode 3, D2/D1 is preferably following equation (5), which is obtained by approximating a relationship between D1 and rated power (referred to as "P1" for convenience).

$$D1 = -8 \times 10^{-8} P1^2 + 0.0017 P1 + 1.0033 \quad (5)$$

Table 2 shows results obtained by ascertaining whether lamps with rated powers of 4 kW and 6.5 kW configured as described above help to similarly reduce the tendency of the lamps to go out. Methods of determining measurements in lamp going-out and illuminance maintenance corresponded to those in Experiment 1.

TABLE 2

|  | Rated Power | D1 | D2 | H1 | D2/D1 | H1/D1 | Determine Lamp Going Out | Determine Illuminance Maintenance |
|---|---|---|---|---|---|---|---|---|
| Comparative Example 3 | 4 kW | 7 | 14.2 | 3 | 2.02 | 0.43 | B | C |
| Comparative Example 4 | | 7 | 7.6 | 1.5 | 1.09 | 0.21 | B | D |
| Example 10 | | 6 | 8.8 | 2 | 1.47 | 0.33 | A | C |
| Example 11 | | 8.4 | 11.9 | 3 | 1.41 | 0.36 | A | C |
| Example 12 | | 9 | 11.8 | 3 | 1.31 | 0.33 | A | C |
| Example 13 | | 7 | 9.1 | 3 | 1.3 | 0.43 | A | D |
| Example 14 | | 6 | 7.6 | 3 | 1.27 | 0.5 | A | D |
| Example 15 | | 6 | 7.1 | 2.5 | 1.18 | 0.42 | A | D |
| Comparative Example 5 | 6.5 kW | 8.4 | 17.9 | 4 | 2.14 | 0.48 | B | C |

TABLE 2-continued

| | Rated Power | D1 | D2 | H1 | D2/D1 | H1/D1 | Determine Lamp Going Out | Determine Illuminance Maintenance |
|---|---|---|---|---|---|---|---|---|
| Comparative Example 6 | 10 | 10.9 | 2 | 1.09 | 0.2 | B | D |
| Example 16 | | 7.4 | 11 | 2.6 | 1.49 | 0.35 | A | C |
| Example 17 | | 9 | 12.5 | 3 | 1.38 | 0.33 | A | C |
| Example 18 | | 8.4 | 12.1 | 4 | 1.44 | 0.48 | A | D |
| Example 19 | | 10 | 12.8 | 4 | 1.28 | 0.4 | A | D |
| Example 20 | | 9 | 11.2 | 4 | 1.24 | 0.44 | A | D |
| Example 21 | | 10 | 11.3 | 3 | 1.13 | 0.3 | A | D |

As shown in Table 2, the results have confirmed that even the lamps with higher rated powers, if configured as described above, help to reduce the tendency of the lamps to go out.

The present invention is not limited to the embodiment and examples described above in any way. Various improvements and modifications may be made without departing from the scope of the subject matter of the present invention.

DESCRIPTION OF REFERENCE SIGNS

1 Light-emitting tube
2 Cathode
3 Anode
4a Lead rod
4b Lead rod
Xenon lamp
21 Body part
22 Chip part
22a First part
22b Second part
23 Outer profile
23a Outer profile
23b Outer profile
30 Equipotential surface
80 Xenon lamp
81 Light-emitting tube
82 Cathode
82a Diameter
82b Position
82c Position
83 Anode
A1 Arc
A2 Arc
R1 Central axis

The invention claimed is:

1. A xenon lamp for a projector, the xenon lamp comprising:
a light-emitting tube; and
an anode and a cathode that are arranged inside the light-emitting tube so as to face each other through a gap in a first direction,
the anode including:
a body part whose cross-sectional area cut along a first plane orthogonal to the first direction is substantially uniform; and
a chip part whose cross-sectional area cut along the first plane is smaller than the cross-sectional area of the body part, the chip part protruding in a direction that extends from an end face of the body part adjacent to the cathode toward the cathode,
the chip part including:
a first part joined to the body part, the first part protruding toward the cathode and having a tapered shape such that a cross-sectional area of the first part cut along the first plane shrinks with a decrease in distance to the cathode in the first direction; and
a second part joined to the first part, the second part protruding toward the cathode and having a shape such that an angle of inclination of an outer profile of the second part differs from an angle of inclination of an outer profile of the first part when viewed in a second direction that is parallel to the first plane and orthogonal to the first direction,
wherein the shape of the second part satisfies the following relationships (1) and (2):

$$0.5 \leq D2/D1 \leq 1.5 \quad (1)$$

$$0.3 \leq H1/D1 \leq 1.0 \quad (2)$$

where H1 represents a length of the second part in the first direction; D1 represents a length of a distal end of the second part adjacent to the cathode in a third direction orthogonal to the first direction and the second direction; and D2 represents a length between places at which the first part and the second part are joined together in the third direction, when viewed in the second direction.

2. The xenon lamp for a projector, according to claim 1, wherein the shape of the second part further satisfies the following relationships (3) and (4):

$$1.2 \leq D2/D1 \leq 1.5 \quad (3)$$

$$0.31 \leq H1/D1 \leq 0.36 \quad (4)$$

where H1 represents a length of the second part in the first direction; D1 represents a length of a distal end of the second part adjacent to the cathode in a third direction orthogonal to the first direction and the second direction; and D2 represents a length between places at which the first part and the second part are joined together in the third direction, when viewed in the second direction.

3. The xenon lamp for a projector according to claim 1, wherein the xenon lamp is disposed so that the first direction matches a horizontal direction during lighting up.

4. The xenon lamp for a projector according to claim 2, wherein the xenon lamp is disposed so that the first direction matches a horizontal direction during lighting up.

* * * * *